United States Patent Office 3,555,091
Patented Jan. 12, 1971

3,555,091
DIPROPYLACETYLANILIDES
Jean-Louis Alain Benoit-Guyod and André Louis Boucherle, Grenoble, France, assignors to Laboratoires J. Berthier, Grenoble, France, a French company
No Drawing. Filed Oct. 6, 1967, Ser. No. 673,267
Claims priority, application France, Jan. 13, 1967, 91,010
Int. Cl. C07c *103/30*
U.S. Cl. 260—562
6 Claims

ABSTRACT OF THE DISCLOSURE

Dipropylacetylanilide and the nuclear substituted hydroxy, alkoxy, halo, nitro, halomethyl, amino, amido or alkyl derivatives are described which are useful as intermediates in organic synthesis and as food preservatives.

The present invention has for its object, new chemical compositions which are derivatives of dipropylacetylanilide corresponding to the following general formula:

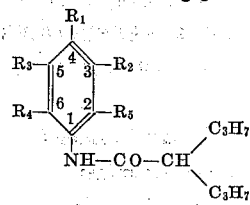

in which $R_1$, $R_2$, $R_3$, $R_4$, $R_5$ are together or separately: a hydrogen atom; a hydroxyl group, plain or substituted by, in particular, a methyl group, an ethyl group, a butyl group, a propyl group, or otherwise; an atom of halogen, or an $NO_2$ group; a halomethyl group such as $CCl_3$ or $CBr_3$ or $CF_3$ or $CI_3$; an amine group or one of the corresponding amides; or a methyl, ethyl, butyl, propyl or other group.

The previously described organic or halogen radical can be substituted as mono or plural substituents in ortho, meta, or para positions, or a combination of the two, in the dipropylacetylanilide, corresponding to the following formula:

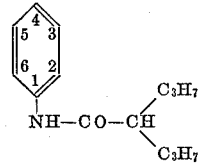

These products are useful as intermediates in the synthesis of organic compounds, or as preservative agents in the food industry. They are also useful as analgesic, antipyretic and antiinflammatory agents which use is the subject of a U.S. patent application filed simultaneously herewith.

The present invention aims at the following products more particularly: 4 - hydroxy dipropylacetylanilide in which $R_2$, $R_3$, $R_4$ and $R_5$=H and $R_1$=OH; 4-ethoxy dipropylacetylanilide in which $R_2$, $R_3$, $R_4$ and $R_5$=H and $R_1$=$OC_2H_5$; 4-methoxy dipropylacetylanilide in which $R_2$, $R_3$, $R_4$ and $R_5$=H and $R_1$=$OCH_3$; 4-trifluoromethyl dipropylacetanilide in which $R_2$, $R_3$, $R_4$ and $R_5$=H and $R_1$=$CF_3$; 4-acetylamido dipropylacetanilide in which $R_2$, $R_3$, $R_4$ and $R_5$=H and $R_1$=NH—CO—$CH_3$; 4-methyl dipropylacetylanilide in which $R_2$, $R_3$, $R_4$ and $R_5$=H and $R_1$=$CH_3$; 4-chloro dipropylacetylanilide in which $R_2$, $R_3$, $R_4$ and $R_5$=H and $R_1$=Cl; 3 - trifluoromethyl dipropylacetanilide in which $R_1$, $R_3$, $R_4$ and $R_5$=H and $R_2$=$CF_3$; 3,5-bistrifluoromethyl dipropylacetanilide in which $R_1$, $R_4$ and $R_5$=H and $R_2$ and $R_3$=$CF_3$; 3 - methoxy dipropylacetylanilide in which $R_1$, $R_3$, $R_4$ and $R_5$=H and $R_2$=$OCH_3$; 2-trifluoromethyl dipropylacetanilide in which $R_1$, $R_2$, $R_3$ and $R_4$=H and $R_5$=$CF_3$; 2 - methoxy dipropylacetylanilide in which $R_1$, $R_2$, $R_3$ and $R_4$=H and $R_5$=$OCH_3$; 2,4-dichloro dipropylacetanilide in which $R_2$, $R_3$ and $R_4$=H and $R_1$ and $R_5$=Cl; 3,4 - dichloro dipropylacetanilide in which $R_3$, $R_4$ and $R_5$=H and $R_1$ and $R_2$=Cl; 3,4,6-trichloro dipropylacetanilide in which $R_3$ and $R_5$=H and $R_1$, $R_2$ and $R_4$=Cl; 2,4-dimethyl dipropylacetylanilide in which $R_2$, $R_3$ and $R_4$=H and $R_1$ and $R_5$=$CH_3$, 3,4-dimethyl dipropylacetylanilide in which $R_3$, $R_4$ and $R_5$=H and $R_1$ and $R_2$=$CH_3$; 2-methoxy-3-nitro dipropylacetylanilide in which $R_1$, $R_9$ and $R_4$=H and $R_2$=$NO_2$ and $R_5$=$OCH_3$; 5 - trifluoromethyl - 2 - chloro dipropylacetanilide in which $R_1$, $R_2$ and $R_4$=H and $R_5$=Cl and $R_3$=$CF_3$.

The physico-chemical chemical characteristics of these particular products are summarized in the following table.

| Name of product | Concentration alcohol[1] | Appearance | Melting point °F. after recrystallization | Yield, R% of the reaction | C% Calculated | C% Found | H% Calculated | H% Found | N% Calculated | N% Found |
|---|---|---|---|---|---|---|---|---|---|---|
| 4-hydroxy dipropylacetylanilide | 96 | Beige pink crystalline powder. | 104 | 64 | 71.95 | 71.03 | 8.99 | 8.86 | 5.95 | 6.21 |
| 4-ethoxy dipropylacetylanilide | 60 | White crystalline powder. | 153 | 92 | 72.96 | 72.88 | 9.57 | 9.65 | 5.32 | 5.63 |
| 4-methoxy dipropylacetylanilide | 96 | do | 164 | 50 | 72.25 | 72.04 | 9.30 | 9.26 | 5.62 | 5.67 |
| 4-trifluoro methyldipropylacetanilide | 80 | do | 157 | 74 | 62.72 | 62.66 | 7.02 | 7.03 | 4.88 | 4.97 |
| 4-acetylamido dipropylacetanilide | 60 | do | 250 | 71 | 68.39 | 69.35 | 9.08 | 8.86 | 10.55 | 10.27 |
| 4-methyl dipropylacetylanilide | 70 | do | 154 | 81 | 77.21 | 76.88 | 9.93 | 9.84 | 6.— | 6.03 |
| 4-chloro dipropylacetylanilide | 60 | do | 175 | 87 | 66.26 | 66.25 | 7.94 | 7.82 | 5.52 | 5.54 |
| 3-trifluoromethyldipropylacetanilide | 80 | do | 64 | 70 | 62.72 | 62.56 | 7.02 | 6.97 | 4.88 | 4.97 |
| 3,5-ditrifluoromethyldipropylacetanilide | 95 | do | 153 | 89 | 54.08 | 54.36 | 5.39 | 5.42 | 3.94 | 3.86 |
| 3-methoxy dipropylacetylanilide | 70 | do | 110 | 81 | 72.25 | 72.12 | 9.30 | 9.25 | 5.62 | 5.56 |
| 2-trifluoro methyldipropylacetanilide | 80 | do | 100 | 76 | 62.72 | 62.60 | 7.02 | 7.12 | 4.88 | 4.98 |
| 2-methoxy dipropylacetylanilide | 80 | do | 143 | 80 | 72.25 | 72.16 | 9.30 | 9.20 | 5.62 | 5.72 |
| 2,4-dichloro dipropylacetanilide | 70 | do | 103.5 | 62 | 58.34 | 58.01 | 6.64 | 6.62 | 4.86 | 4.84 |
| 3,4-dichloro dipropylacetanilide | 80 | do | 124 | 81 | 58.34 | 58.10 | 6.64 | 6.52 | 4.85 | 4.97 |
| 3,4,6-trichloro dipropylacetanilide | 96 | do | 124.5 | 85 | 52.11 | 52.29 | 5.62 | 5.50 | 4.34 | 4.53 |
| 2,4-dimethyl dipropylacetylanilide | 60 | do | 140 | 98 | 77.68 | 77.27 | 10.19 | 10.16 | 5.66 | 5.59 |
| 3,4-dimethyl dipropylacetylanilide | 60 | do | 109 | 49 | 77.68 | 77.47 | 10.19 | 9.97 | 5.66 | 5.60 |
| 2-methoxy-3-nitro dipropylacetylanilide | 80 | do | 122 | 17 | 61.21 | 60.90 | 7.53 | 7.56 | 9.52 | 9.70 |
| 5-trifluour-methyl-2-chloro dipropylacetanilide | 70 | do | 77 | 49 | 55.00 | 55.91 | 5.95 | 6.12 | 4.35 | 4.45 |

[1] Used for recrystallization for preparation, percentage.

The following examples are presented in order to disclose the invention more fully. It should be understood, however, that they are not intended to limit the invention in any way.

EXAMPLE I

Preparation of dipropylacetyl hydroxy-4-anilide 4.89 gm. of dipropylacetyl chloride (30 millimoles) are heated at reflux for one hour with 6.54 gm. of para aminophenol (60 millimoles) in solution in 100 ml. of anhydrous dioxane. The reaction mixture is evaporated and the residue is dissolved in 20 ml. of ethyl alcohol at 96°. The hot solution is filtered, the filtrate is cooled to 0° and crushed ice is added very slowly until precipitation is completed. This operation is repeated several times.

EXAMPLE II

Preparation of the other anilides

All the other anilides according to the invention can be obtained by the action of 30 millimoles of dipropylacetyl chloride on 60 millimoles of the corresponding substituted anilide, only varying the concentration of the ethyl alcohol for recrystallization (see the column on the left in the above table).

The preparation of dipropylacetyl-chloro-2-trifluoromethyl-5-anilide will be given in detail only by way of example.

EXAMPLE III 4.89 gm. of dipropylacetyl chloride (30 millimoles) are placed in contact with 11.76 gm. of chloro-2-trifluoromethyl-5-aniline (60 millimoles) at ambient temperature over a period of 10 minutes. A precipitate is formed which is separated. The filtrate is washed by agitation with water in a separatory funnel until the aqueous phase no longer gives any turbidity with silver nitrate in nitric medium. The aromatic phase is then dried and evaporated. The residue is purified by precipitation by water from its alcoholic solution.

Others may practice the invention in any of the numerous ways which will be suggested by this disclosure to one skilled in the art by employing one or more of the novel features disclosed or equivalents thereof. All such practice of the invention is considered to be a part hereof provided it falls within the scope of the appended claims.

We claim:
1. A compound of the formula

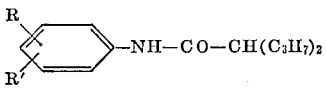

wherein R is trifluoromethyl and R' is selected from the group consisting of trifluoromethyl, chloro and hydrogen.

2. A compound as defined by claim 1 wherein R is 4-trifluoromethyl and R' is hydrogen.

3. A compound as defined by claim 1 wherein R is 2-trifluoromethyl and R' is hydrogen.

4. A compound as defined by claim 1 wherein R is 3-trifluoromethyl and R' is hydrogen.

5. A compound as defined by claim 1 wherein R is 3-trifluoromethyl and R' is 5-trifluoromethyl.

6. A compound as defined by claim 1 wherein R is 5-trifluoromethyl and R' is 2-chloro.

References Cited

UNITED STATES PATENTS

| | | | |
|---|---|---|---|
| 3,418,345 | 12/1968 | Baker | 260—562 |
| 3,407,056 | 10/1968 | Schwartz | 260—562 |
| 3,281,467 | 10/1966 | Wilson et al. | 260—562 |

OTHER REFERENCES

Benoit-Guyod et al., Bull. Soc. Chim. Fr. (1965), pp. 1660–1661.

HENRY R. JILES, Primary Examiner

H. I. MONTZ, Assistant Examiner

U.S. Cl. X.R.

424—324